May 17, 1949.  J. H. TATHWELL  2,470,586
MEANS FOR MAINTAINING MULTIPLE RECORDS
Filed March 21, 1945  5 Sheets-Sheet 1
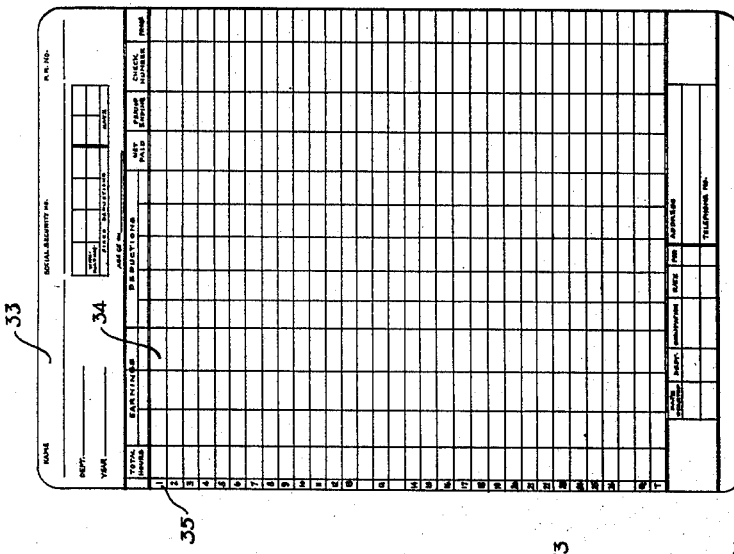
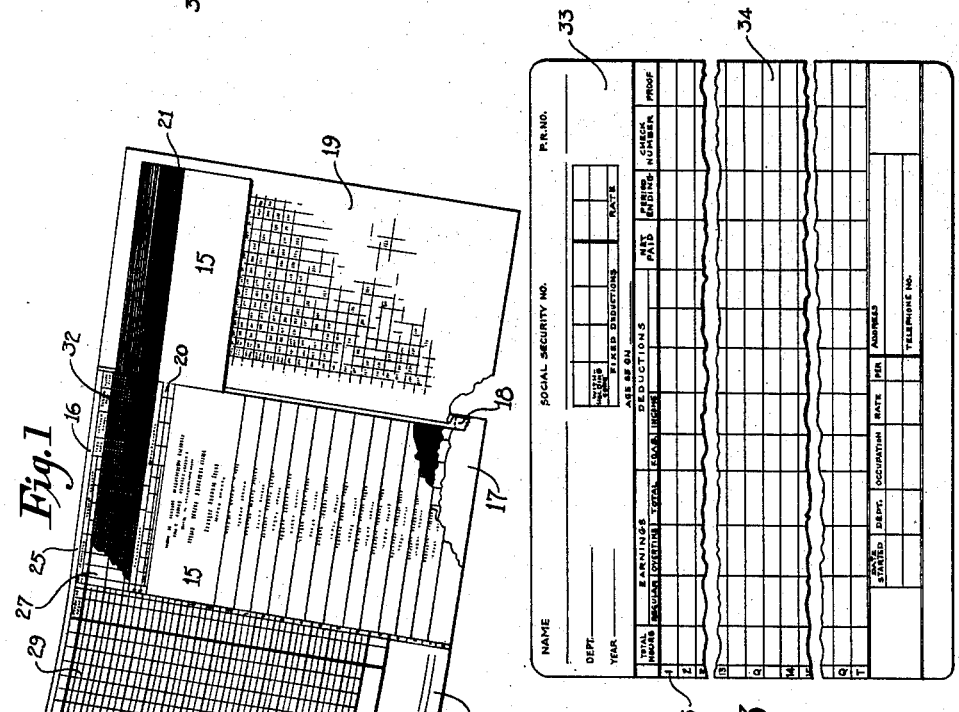
Inventor
Joseph H. Tathwell
By Warley L. Parrott
Attorney May 17, 1949.　　　　　J. H. TATHWELL　　　　　2,470,586
MEANS FOR MAINTAINING MULTIPLE RECORDS
Filed March 21, 1945　　　　　　　　　　　　　5 Sheets-Sheet 2

Inventor
Joseph H. Tathwell
By Wesley L. Parrott
Attorney

May 17, 1949. J. H. TATHWELL 2,470,586
MEANS FOR MAINTAINING MULTIPLE RECORDS
Filed March 21, 1945 5 Sheets-Sheet 3

Fig. 7

May 17, 1949.　　　　　J. H. TATHWELL　　　　　2,470,586
MEANS FOR MAINTAINING MULTIPLE RECORDS
Filed March 21, 1945　　　　　　　　　　　　　5 Sheets-Sheet 4

Patented May 17, 1949

2,470,586

UNITED STATES PATENT OFFICE 2,470,586

MEANS FOR MAINTAINING MULTIPLE RECORDS

Joseph H. Tathwell, Charlotte, N. C.

Application March 21, 1945, Serial No. 583,947

12 Claims. (Cl. 282—9)

This invention relates to means for maintaining multiple records, and more particularly to means adapted for maintaining payroll records.

As is well known, the payroll records and reports required by the provisions of various public laws necessitates a substantial amount of record keeping. Where the number of employees involved is large enough to justify the expense, payroll machines may be used to expedite the work of maintaining the necessary records and making the required reports; but where the number of employees is small so that special machines are not practical and ordinary hand-posting methods must be relied upon, the time and effort required by these records and reports is extremely burdensome.

The means for maintaining payroll records of my invention substantially facilitates the maintenance and preparation of payroll records and reports. According to the present invention basic or original wage computation and summary records, individual cumulative earnings records, employee's earnings statements and associated payroll checks of cash receipts and pay envelopes, are arranged for use in a convenient booklet form which coordinates these records and eliminates the necessity for multiple individually posted entries.

An important feature of my invention is an arrangement of ganged record forms assembled in overlapped relation, and disposed in record correspondence with a summary sheet for simultaneous posting; and further adapted to allow individual cumulative record forms, such as ledger cards and the like, to be interleaved to underlie a particular record form, and conveniently aligned for posting at the same time that a record form entry and summary posting are made. Impression transfer means are appropriately provided so that entries made on a record form are simultaneously duplicated as desired on the other forms.

My invention is illustrated in the accompanying drawing, in which:

Fig. 1 is a perspective view illustrating the general arrangement of one embodiment of my invention.

Fig. 2 is a plan view of the form of individual earings record ledger card used as a part of my payrooll record means;

Fig. 3 is a corresponding view showing the arrangement of the ledger card more in detail;

Figures 4, 5, 6:
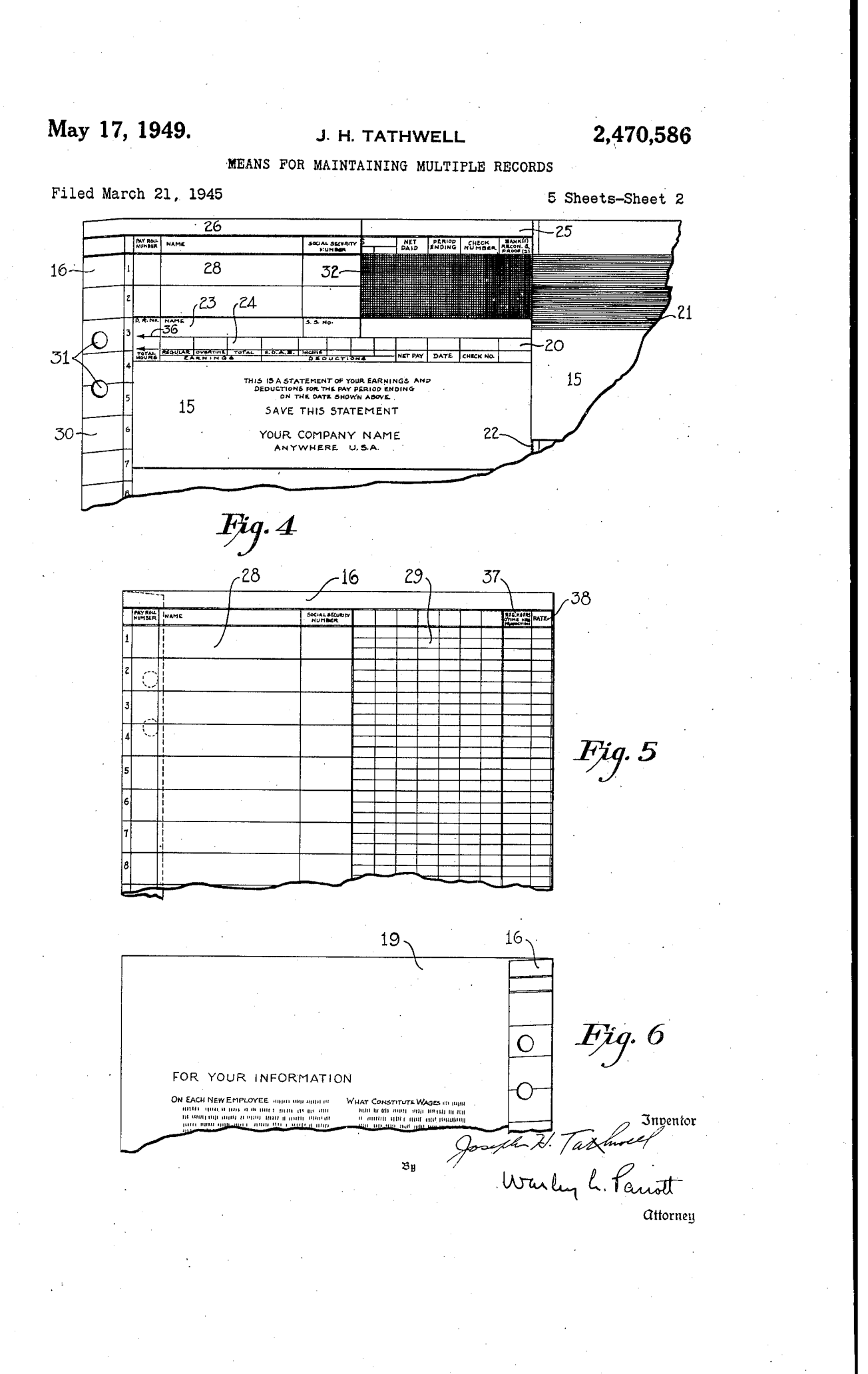

Fig. 4 is a plan view partly cut away of my payroll record means with the payroll summary sheet folded in employee designation entry position.

Fig. 5 is a partial plan view showing the payroll summary sheet folded in interim wage basis entry record position;

Fig. 6 is a corresponding face plan view further illustrating the manner in which the payroll summary sheet is folded;

Fig. 7 is a plan view partly cut away showing the payroll summary sheet in extended position and a ledger card in place for making earnings statement entries;

Fig. 8 is a plan view partly cut away of a modified embodiment of my payroll record means in which each earnings statement form is associated with a payroll check form;

Fig. 9 is a plan view partly cut away of a further modification in which each earnings statement is associated with a cash receipt form and pay envelopes are included as a part of my payroll record means;

Fig. 10 is a plan view illustrating a modification of the manner of assembling my payroll record means; and Figs. 11 and 12 are plan views showing further modifications of the embodiment illustrated in Fig. 10.

As illustrated in Fig. 1, my invention comprises a plurality of earnings statement forms 15 bound in booklet form together with a payroll summary sheet 16 adapted for basic or original wage computations and summary records. The bound statement forms 15 and summary sheet 16 are provided with a back cover member 17 of chip board or card stock, or other relatively stiff backing material, and with a front marginal strip member 18 of similar material. A suitable top cover member 19 may also be provided, if desired, which may be inscribed with appropriate identifying indicia, or pertinent information or instructions, or the like.

The earnings statement forms 15 are bound in overlapping relation and provided with entry spaces 20 arranged on the portions of each statement form which extend beyond the next underlying statement form by virtue of the overlapping relation. The reverse side of the portion of the statement forms 15 on which the entry spaces 20 appear is provided with an impression transfer material, such as carbon back, as indicated at 21.

The earnings statement forms 15 are detachable along weakened separation lines 22 arranged adjacent the top marginal binding strip 18, and the statement forms 15 may be turned successively in the manner of a page with respect to the marginal binding 18 to expose underlying statement forms.

The entry spaces 20 may be arranged, within certain limitations which will appear below, in any convenient manner. A suitable arrangement, as illustrated in the drawing, consists of a line of employee designation entry spaces 23 and a line of earnings statement entry spaces 24. Representative employee designation entry spaces 23 comprise appropriately indicated entry spaces for payroll number, name, and social security number. The earnings statement entry spaces 24 may consist of similarly indicated entry spaces for total hours worked; regular, overtime and total earnings; social security and income tax withholding deductions, and a suitable number of blank entry spaces for irregularly recurring deductions; together with entry spaces for net pay, date, and a cross reference to the corresponding check number. The portion of the earnings statement forms 15 not occupied by the entry spaces 20 may contain printed information for the employee concerning the earnings statement and an identification of the employee, etc.

The payroll summary sheet 16 is arranged in correspondence with the entry spaces 20. As previously mentioned the summary sheet 16 is bound with the overlapped statement forms in underlying relation; and it is further arranged with a portion 25 in fixed underlying relation to the statement forms 15, and an extensible portion 26 which is foldable to underlie the statement forms. The fixed underlying portion 25 of the payroll summary sheet 16 is arranged with correspondingly headed columnar spaces 27 in registry with the earnings statement entry spaces 24 of each statement form 15; and the extensible portion 26 has similarly headed columnar spaces 28 registering with the employee designation entry spaces 23 of each statement form 15 when this extensible portion 26 is in folded position, and related columnar spaces 29 for interim wage basis entries in correspondence with each statement form 15. The columnar spaces 29 for interim wage basis entries are conveniently arranged with a column for each day of the pay period, such as is shown in the drawing for a weekly pay period. Suitable horizontal divisions of the columnar spaces 29 may be further provided to separate regular and overtime entries, or other wage basis differential entries.

The payroll summary sheet 16 may also be provided with a binding portion 30 in which suitably positioned punched holes 31 are arranged, to facilitate the preservation of the summary sheets 16 in record binders or the like, as a record or original wage computations. A weakened separation line (not shown) may be arranged adjacent the marginal binding strip 18 so that the summary sheet 16 may be readily removed for record binding.

Additional impression transfer means 32, such as carbon paper or the like, is disposed between the earnings statement forms 15 and payroll summary sheet 16 for duplicating entries, as will appear more clearly below, on the fixed underlying portion 25 of the summary sheet 16. The carbon paper 32 may be bound between the back cover member 17 and front marginal strip member 18, and should be provided with a displaceable tissue guard (not shown) to avoid unintended marking of the summary sheet 16.

Individual earnings record ledger cards 33, as illustrated in Figs. 2 and 3, are preferably provided as a part of my payroll record means. The ledger cards 33 are adapted for interleaving with the earnings statement forms 15, and are arranged with correspondingly headed columnar spaces 34 having serial positions 35 of correspondence with the earnings statement entry spaces 24 on the statement forms 15. The ledger cards 33 serve as individual cumulative earnings records, and the serial positions 35 are accordingly arranged for recording at successive payroll periods. As the payroll record means illustrated in the drawing is adapted for weekly payrolls, the serial positions 35 illustrated correspond to weeks of the years. Provision may be made for periodic cumulative totals as shown. The reverse side (not shown) of the ledger card 33 would be similarly arranged to complete the record for the year. Spaces at the top and bottom of the ledger cards 33 are used for employee identification entries and other payroll information as illustrated in Figs. 2 and 3.

The operative relation of the various components of my payroll record means may be discussed in terms of the procedure followed in maintaining payroll records during a given payroll period. At the beginning of the period, the payroll is made up as follows:

With the extensible portion 26 of the payroll summary sheet 16 folded in registry with the employee designation entry spaces 23 of the overlapped statement forms 15, as illustrated in Fig. 4, the employee designation entries are made on the earnings statement forms 15. A statement form 15 is made up in this manner for each employee, the statement forms being folded over as they are filled in to expose the entry spaces 20 on the next underlying statement form, which procedure may be repeated until a statement form for each employee has been completed. As the statement forms 15 are entered in this manner, the entries made are transferred by virtue of the carbon back 21 arranged on the statement forms to the columnar spaces 28 on the extensible portion 26 of the payroll summary sheet 16. As a consequence, when employee designation entries have been completed on a statement form 15 for each employee, the duplication accomplished by the carbon black 21 results in a listing of the employee designations in the columnar spaces 28 on the payroll summary sheet 16.

For interim wage basis records, the extensible portion 26 of the payroll summary sheet 16 is extended and folded around the back cover member 17 of the booklet assembly, as illustrated in Figs. 5 and 6. This arrangement disposes the payroll summary sheet 16 in convenient form for keeping the necessary records in the interim wage basis entry spaces 29, and maintains the assembly intact during the payroll period. The interim wage basis records are maintained in relation to the duplicate employee designation entries made on the payroll summary sheet 16. The form of payroll summary sheet 16 illustrated in the drawing is adapted for weekly payroll periods and is accordingly arranged with seven columnar spaces. It will be recognized, of course, that these spaces might be otherwise arranged if a different payroll period were used.

Figure 7:
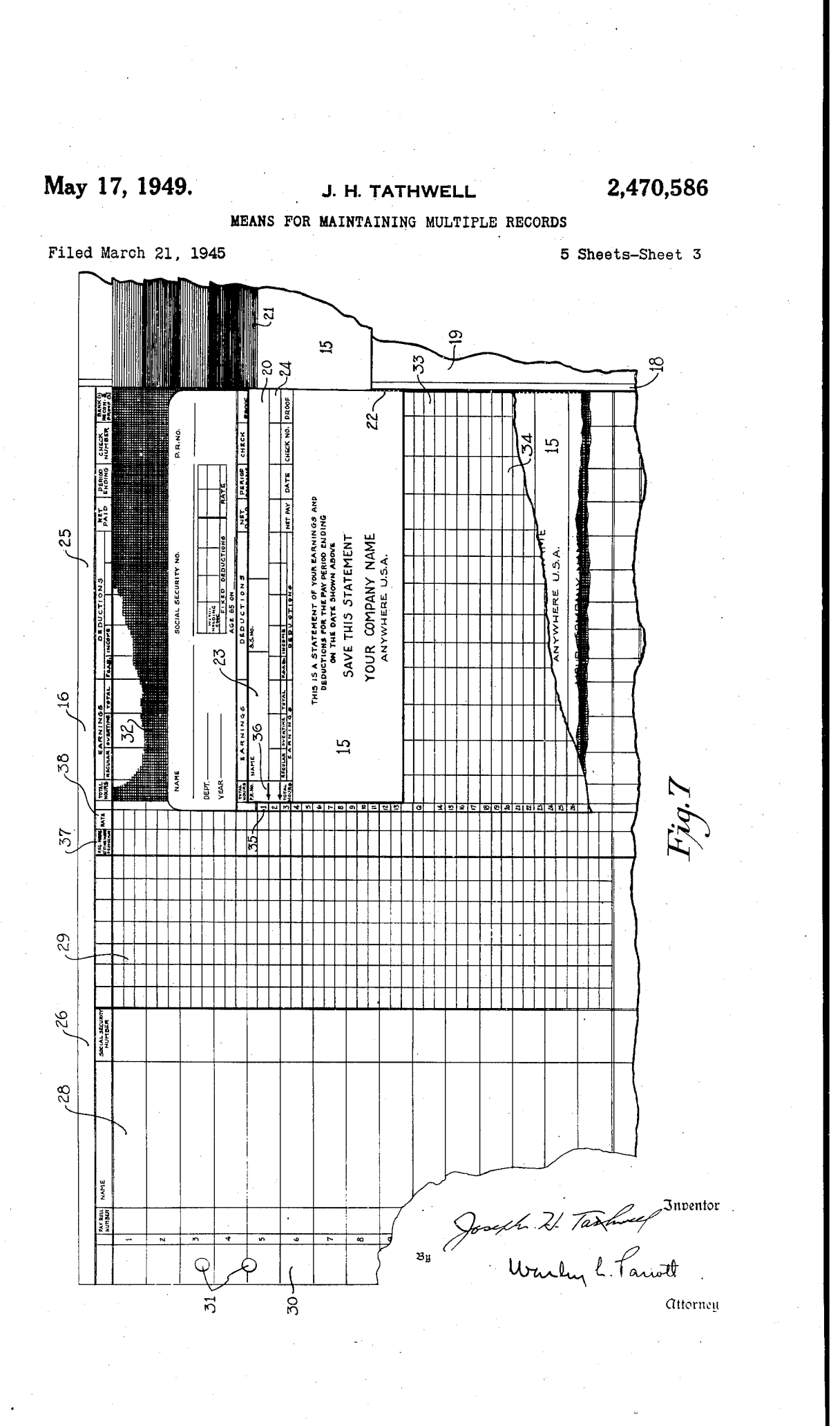

At the end of the payroll period when the wage basis entries have been completed, the extensible portion 26 of the payroll summary sheet 16 is unfolded in fully extended relation with respect to the booklet, as illustrated in Fig. 7, to dispose it for making the appropriate wage computations and earnings statement entries. For this purpose, the individual earning record ledger card 33 corresponding to the employee designation entries on the first statement form 15 is interleaved in appropriate serial correspondence.

In order that the ledger cards 33 may be easily adjusted for correspondence with the earnings statement 15, the ledger cards 33 are arranged so that the indications of their serial positions of correspondence 35 extend beyond the statement forms when the ledger cards are interleaved (see Fig. 7). The front marginal strip member 18 provides a vertically aligned stop for the interleaved ledger cards 33. The statement forms 15 are further provided with indicating arrows 36 positioned in relation to the earnings statement entry spaces 24 and so disposed that when these arrows 36 are aligned with the indication for a particular serial position 35 on a ledger card 33, the respective earning statement entry spaces 24 on the statement form 15 and ledger card 33 will be in registry, and the carbon back 21 on the statement form 15 will effect duplication on the ledger card of earnings statement entries made on the statement form.

At the same time the carbon paper 32 bound in relation to the fixed portion 25 of the payroll summary sheet 16 will cause further duplication of these entries in the columnar spaces 25 on the payroll summary sheet 16. As a result, the original wage computation records on the payroll summary sheet 16, the individual cumulative earning records on the ledger cards 33, and the earnings statement forms 15 are all made up simultaneously without the necessity for multiple, individually posted entries.

Moreover, the computations for the earnings statement entries may be made directly on my payroll record means with information which is readily available. With the interim wage basis records completed for the payroll period as previously mentioned, these records may be totaled in a column 37 provided for that purpose adjacent the interim wage basis columns 29, and which may be conveniently arranged for separate totals of regular time and overtime, or for other separate totals which may be necessary in connection with premium piece work rates or other methods of wage computation. With this information totaled the gross wages due for the period may be readily calculated by extending these totals against the rate for the particular employee. This rate would appear, according to standard practice, on the interleaved ledger card 33, and by reference to the ledger card 33 it may accordingly be entered in a rate column 38 arranged in relation to the column 37 of wage basis totals. With this information entered, the wage basis totals may be extended at the indicated rates to arrive at gross pay figures for entry on the statement form 15. The necessary deductions from gross pay may then be figured in the usual manner and also entered. Fixed deductions such as social security, and income tax withholding payments may be made on the basis of information supplied on the ledger card. Often variable deductions are made according to any convenient method indicated, the earning statement may be completed by entering the resulting net pay.

After a complete set of earnings statement forms 15 for a payroll period have been completed in this manner, the original wage basis computations and a copy of all earnings statement entries will appear on the summary sheet 16 in convenient form for permanent filing as required by law. Also, individual cumulative earning records will have been simultaneously copied on the ledger cards 33 to serve as the basis for the periodic reports which must be made to various governmental agencies.

Figures 8, 9:
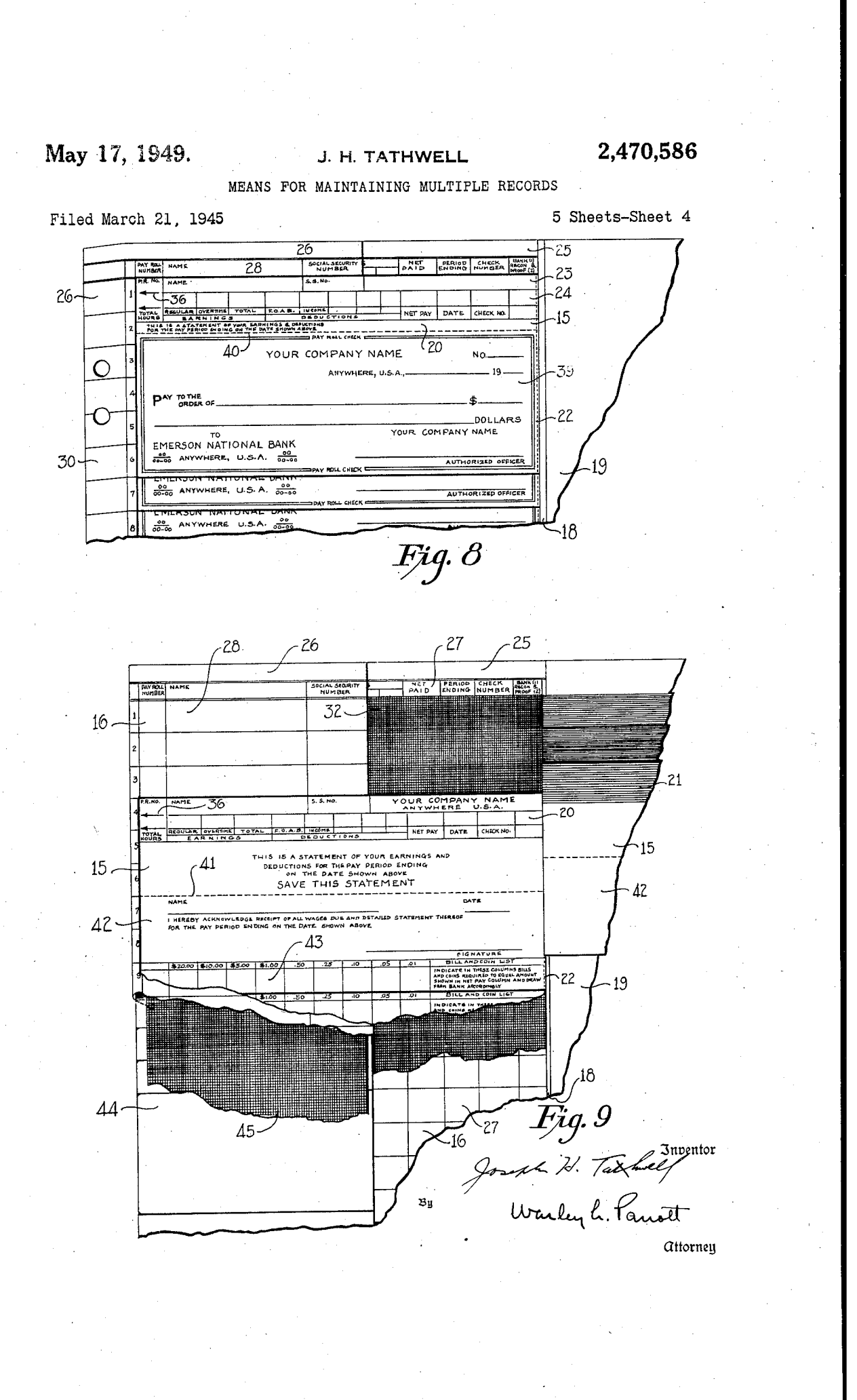

The earnings statement forms 15, which have been completed in the manner just described, may then be detached along the weakened separation lines 22 and used as a basis for making out a paycheck for each employee. Where it is not considered necessary to maintain a separate check stub record, the statement forms 15 may be modified to include an associated paycheck form 39, as illustrated in Fig. 8. The arrangement in this instance comprises a statement form 15 of relatively smaller extent with the paycheck 39 associated along a weakened separation line 40 provided to allow the paycheck to be detached from the statement form.

Another modification adapted for cash payroll systems is illustrated in Fig. 9. According to this modification, a statement form 15 is associated along a weakened separation line 41 with a cash receipt form 42 adapted for signing by the employee in acknowledgment when he is paid. The cash receipt form 42 may conveniently be provided with a bill and coin list 43 as an aid in assembling the necessary amount and denominations of money for the payroll. The term "earnings statement form" as used herein designates the whole of the composite strip 15 and 39 as shown in Fig. 8, or 15 and 42 as shown in Fig. 9, as well as the statement forms 15 shown in Fig. 7.

The above described arrangement for cash payroll system may be further modified to include pay envelopes 44, if desired, and, as illustrated in Fig. 9, my payroll record means may be readily adapted for this modification. A set of pay envelopes 44 can be conveniently made up at the beginning of a payroll period by nesting them in the fold of the extensible portion 26 of the payroll summary sheet 16 at the time the employee designation entries are made on the statement forms 15. The pay envelopes 44 may be arranged in groups provided with carbon paper 45, or other impression transfer means, and secured in overlapped relation corresponding to the disposition of the statement forms 15. In this manner, the employee designation entries made on each statement form 15 are copied on a corresponding pay envelope 44, and the group of pay envelopes 44 completed in this manner for each employee may then be filed for use at the end of the payroll period.

An alternate procedure is to handle the pay envelopes 44 singly. With this latter procedure the fold of the extensible portion 26 of the summary sheet 16 would act as a stop for the pay envelopes 44 and thus afford a ready means for aligning the pay envelopes with the employee designation entry spaces 23 on the statement forms 15. The fold of the extensible portion 26 of the summary sheet 16 would also serve to align a group of pay envelopes 44 arranged according to the first procedure suggested above, and in this case the binding portion 30 of the summary sheet 16 could be folded to completely nest the pay envelopes 44.

The manner of assembling the payroll record means of my invention may be modified to eliminate the back cover member 17 and the front marginal strip member 18, if desired. If this is done, however, it will be necessary to provide some means for preventing the pull of statement forms 15 which have been turned to expose underlying statement forms from disturbing the disposition of unturned statement forms with respect to the payroll summary sheet 16.

That is, the turned statement forms 15 will exert a pull around the marginal binding which will tend to raise the unturned statement forms near the marginal binding and thus destroy the alignment of the unturned statement forms with the payroll summary sheet 16. When a substantial number of the statement forms have been turned, this effect may become quite pronounced unless some means is provided to prevent it.

Figures 10, 11, 12:
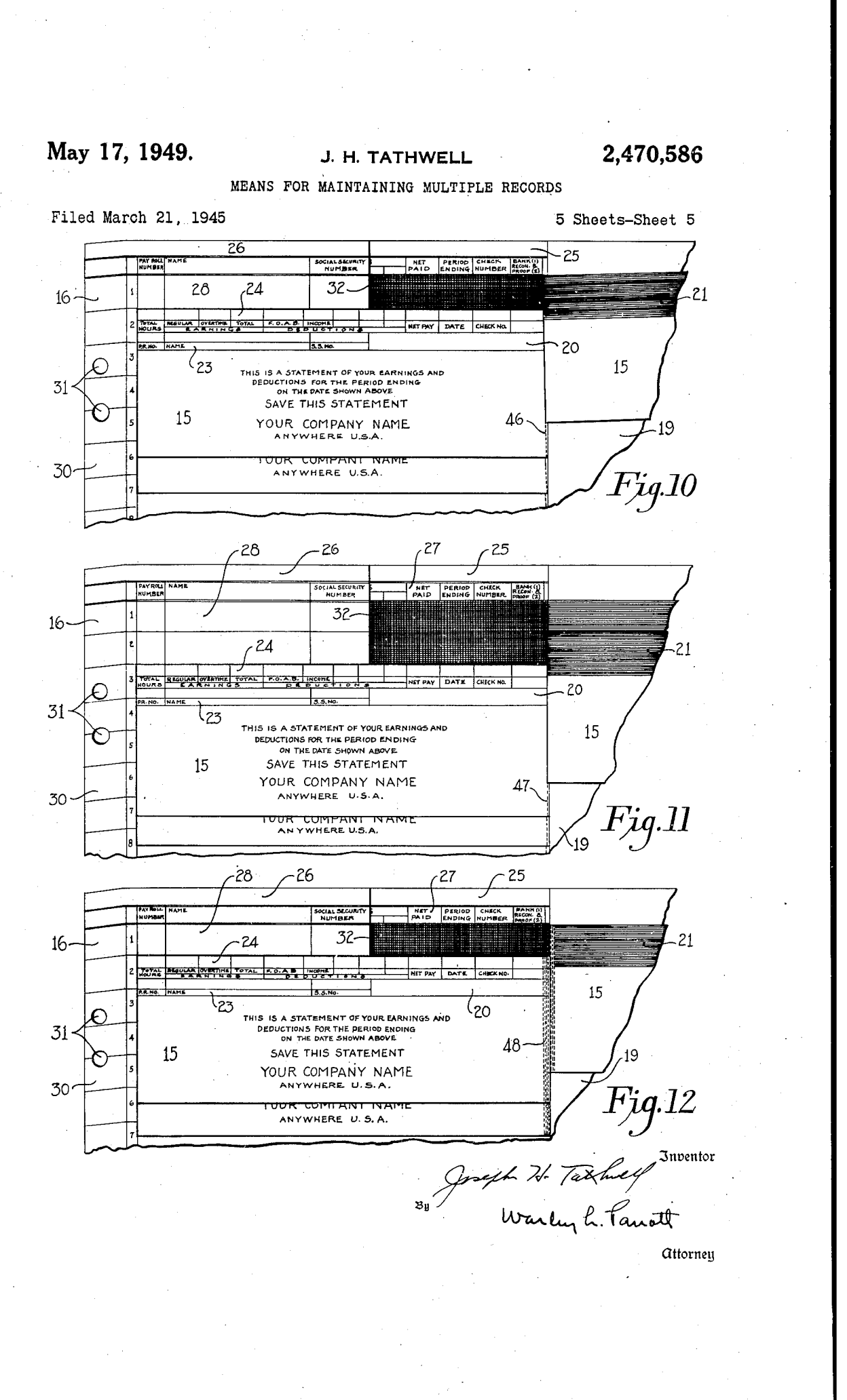

Three methods of arranging the statement forms 15 so that this effect will not occur are illustrated in Figs. 10, 11 and 12. In Fig. 10 the statement forms 15 are provided with diagonally inclined separation lines 46. These separation lines 46 are disposed with sufficient diagonal inclination to position them on the overlapping portion of each statement form 15, with respect to the separation line 46 on the overlapped portion of the next underlying statement form, inwardly toward the marginal binding a distance substantially equivalent to the thickness of an earnings statement form. By this arrangement the statement forms 15 are allowed sufficient clearance to fold over one another so that the undesirable pulling effect described above does not occur.

A comparable result can be accomplished by the arrangement illustrated in Fig. 11. In this arrangement weakened separation lines 47 are arranged vertically but they are offset progressively away from the marginal binding on each underlying statement form 15 a distance substantially equivalent to the thickness of a statement form. This arrangement also provides sufficient clearance to allow the statement forms 15 to be turned without exerting a pull on the unturned forms.

The arrangement shown in Fig. 12 differs in that a series of separation or other weakened or scored lines 48 are arranged in spaced parallel relation adjacent the marginal binding of each statement form. This series of separation lines 48 weakens the marginal binding portion of each statement form sufficiently so that it will lie flat when it is turned and not exert a pull on the unturned forms.

A further modification appearing in Figs. 10, 11 and 12 of the drawing is the inversion of the relative positions of the employee designation entry spaces 23 and the earnings statement entry spaces 24 so that the latter entry spaces are disposed on the statement forms 15 immediately adjacent the extending edge of the extending entry portion 20. This arrangement facilitates the alignment of interleaved ledger cards 33. With a ledger card 33 interleaved in a given serial position 35 of correspondence with the earnings statement entry spaces 24 on a statement form 15, a preceding serial position 35, or in any case a horizontal ruling, will be visible on the interleaved ledger card 33 and provide a guide for adjusting the ledger card readily in aligned position. It is particularly advisable to employ this arrangement of the statement form entry spaces 20 when the back cover member 17 and the front marginal strip member 18 are eliminated and the aligning function of the strip member 18 is consequently not available.

It will be apparent that the payroll record means of my invention described above is subject to numerous variations. For example, if it were desired to maintain the records intended to be kept on the ledger cards 33 in some other manner, the ganged statement forms 15 and payroll summary sheet 16 might still be employed to advantage in the form described. The original wage basis computations and records and earnings statement forms would still be prepared as an integrated operation in a convenient and efficient manner. Also, it would be possible, as an alternate procedure, to provide statement forms 15 ganged in duplicate, instead of using the ledger cards 33. By providing duplicate statement forms 15, the duplicates could be accumulated, much in the way cancelled checks might be handled, and then totaled whenever a periodic report was due.

It will also be apparent that my invention might be readily adapted for use in other instances where multiple records are necessary, and that the improved arrangement of ganged record forms in relation to a summary record form is applicable otherwise than in relation to the payroll records described as an illustrative embodiment of my invention.

I claim:

1. A means for maintaining multiple records comprising a plurality of forms arranged in overlapped relation, whereby appropriately designated areas on each form are disposed in extending relation beyond the next underlying form; a sheet fixed in underlying relation to said overlapped forms and having an extensible portion adapted to be folded under said overlapped forms, said sheet having appropriately designated areas on its underlying portion and on said extensible portion disposed for registration with said first mentioned areas on said forms, and impression transfer means for duplicating entries made on said designated areas of the overlapped forms on the extensible portion of said sheet when in folded position, or on the underlying portion of said sheet with said extensible portion in extended position and in relation to entries duplicated on said extensible portion.

2. In combination, an assembly of partially overlapping forms having appropriately designated areas arranged on the portion of each form extending beyond the next underlying form by virtue of said overlapped relation, and a record sheet secured along one margin in underlying relation to said assembly of overlapping forms, said record sheet having an extensible portion at the free margin opposite said secured margin, said record sheet having appropriately designated areas on its underlying portion and on said extensible portion disposed for registration with said first mentioned areas on said forms, said extensible portion providing in extended position a continuing face correlated for record purposes with the face of the underlying portion of said record sheet, and said extensible portion being foldable to dispose a face area of said extensible portion under said assembly of overlapping forms, whereby matter noted on said designated areas of the overlapping forms may be duplicated on said extensible portion when in folded position, or on the underlying portion of said record sheet with said extensible portion in extended position and in relation to matter duplicated on said extensible portion.

3. A means for maintaining multiple records comprising in booklet form, a plurality of detachable record forms marginally bound in overlapped relation and having appropriate entry spaces arranged on the portions thereof extending beyond the next underlying record form by virtue of said overlapped relation, and a summary sheet bound in underlying relation to said overlapped record forms, said record forms being detachable along weakened separation lines adjacent the marginal binding thereof, and said separation lines being arranged to provide a fold line for said record forms disposed inwardly toward said marginal binding on each record form with respect to the fold lines for succeeding forms to allow said record forms to be turned in the manner of a page without disturbing the disposition of unturned record forms with respect to said summary sheet.

4. A means for maintaining payroll records comprising a plurality of earnings statement forms arranged in overlapped relation and having appropriately indicated spaces for employee designation and earnings statement entries arranged on the portion of each form extending beyond the next underlying form by virtue of said overlapped relation, a payroll summary sheet fixed in underlying relation to said overlapped earnings statement forms and having an extensible portion providing in extended position a continuing face correlated for record purposes with the face of the underlying portion of said payroll summary sheet, said payroll summary sheet having appropriately indicated spaces on its underlying portion and on said extensible portion disposed for registration with said first mentioned spaces on said earnings statement forms, said extensible portion being foldable to dispose a face area of said extensible portion under said overlapped earnings statement forms, whereby employee designation entries made on said indicated spaces of the earnings statement forms may be duplicated on said face area of the extensible portion, and the remaining face area of said extensible portion being adapted in extended position for interim wage basis computations in correspondence with said duplicated employee designation entries, whereby earnings statement entries may be made on said indicated spaces of the earnings statement forms in relation to the duplicated employee designation entries and the corresponding interim wage basis computations on said extensible portions and said earnings statement entries may be duplicated on the underlying portion of said payroll summary sheet.

5. A means for maintaining payroll records as defined in claim 4 and further characterized in that each of said earnings statement forms includes a detachably associated pay check form.

6. A means for maintaining payroll records as defined in claim 4 and further characterized in that each of said earnings statement forms includes a detachably associated cash receipt form.

7. A means for maintaining payroll records as defined in claim 4 and further characterized in that a plurality of pay envelopes in a number equal to the number of earnings statement forms and secured in corresponding overlapped relation are nested and aligned in the fold of said extensible portion of the payroll summary sheet, whereby employee designation entries made on said earnings statement forms and duplicated on said extensible portion may also be duplicated on said pay envelopes.

8. A means for maintaining payroll records comprising, a plurality of earnings statement forms having appropriately indicated spaces for employee designation and earnings statement entries arranged on portions provided with impression transfer means on the reverse side thereof, said statement forms being joined at respective side edge portions in overlapping relation with sufficient overlap to extend the entry portions beyond the next underlying statement form, and said statement forms being detachable from and turnable in the manner of a page with respect to said joined side edge portions; and a payroll summary sheet mounted in underlying relation to said overlapped forms and having a portion in fixed underlying relation to said statement forms and an extensible portion foldable to underlie said statement forms, said fixed underlying portion having appropriately indicated columnar spaces in registry with the earnings statement entry spaces of each statement form, and said extensible portion having appropriately indicated columnar spaces registering with the employee designation entry spaces of each statement form when said extensible portion is in folded position and related columnar spaces for interim wage basis entries, whereby employee designation entries made on said statement forms may be duplicated on said extensible portion when in folded position, and earnings statement entries may be made on said statement forms in relation to the duplicated employee designation entries and the related interim wage basis computations and said earnings statement entires may be duplicated on the underlying portion of said payroll summary sheet when said extensible portion is in extended position.

9. A means for maintaining payroll records comprising, a plurality of earnings statement forms having appropriately indicated spaces for employee designation and earnings statement entries arranged on carbon backed top edge portions thereof, said statement forms being joined at respective side edge portions in overlapping relation with sufficient overlap to extend the entry portions beyond the next underlying statement form, and said statement forms being detachable from and turnable in the manner of a page with respect to said joined side edge portions; a payroll summary sheet mounted in underlying relation to said overlapped statement forms and having a portion in fixed underlying relation to said statement forms and an extensible portion foldable to underlie said statement forms, said fixed underlying portion having appropriately indicated columnar spaces in registry with the earnings statement entry spaces of each statement form, and said extensible portion having appropriately indicated columnar spaces registering with the employee designation entry spaces of each statement form when said extensible portion is in folded position and related columnar spaces for interim wage basis entries; a plurality of individual earnings record ledger cards adapted for interleaving with said overlapped statement forms to underlie a particular statement form and having appropriately indicated columnar spaces arranged in serial positions of correspondence with the earnings statement entry spaces on said statement forms; means for positioning said lerger cards when interleaved so that the columnar spaces in given serial positions register with the earnings statement entry spaces of the particular statement form; and carbon paper and an associated displaceable tissue guard arranged in relation to the fixed portion of said payroll summary sheet for duplicating the earnings statement entries on said fixed portion as such entries are made on the statement forms with a ledger card interleaved.

10. A means for maintaining payroll records comprising, in booklet form, a plurality of detachable earnings statement forms marginally bound in overlapped relation and having appropiate entry spaces arranged on the portions thereof extending beyond the next underlying statement form by virtue of said overlapped relation, and a payroll summary sheet bound in underlying relation to said overlapped statement forms, said statement forms being detachable along weakened separation lines arranged adjacent the marginal binding thereof with sufficient diagonal inclination to position said separation lines on the overlapping portion of each earnings statement form with respect to the separation line on the overlapped portion of the next undelying statement form inwardly toward the marginal binding a distance at least equal to the thickness of an earnings statement form.

11. A means for maintaining payroll records comprising, in booklet form, a plurality of detachable earnings statement forms marginally bound in overlapped relation and having appropriate entry spaces arranged on the portions thereof extending beyond the next underlying statement form by virtue of said overlapped relation, and a payroll summary sheet bound in underlying relation to said overlapped statement forms, said earnings statement forms being detachable along weakened separation lines arranged adjacent the marginal binding thereof and offset progressively away from said marginal binding on each underlying statement form a distance at least equal to the thickness of a statement form.

12. A means for maintaining payroll records comprising, in booklet form, a plurality of a detachable earnings statement forms marginally bound in overlapped relation and having appropriate entry spaces arranged on the portions thereof extending beyond the next underlying statement form by virtue of said overlapped relation, and a payroll summary sheet bound in underlying relation to said overlapped statement forms, said earnings statement forms being detachable along weakened separation lines arranged adjacent the marginal binding thereof, a series of said separation lines being arranged in spaced parallel relation on each statement form to allow said statement forms to be turned successively in the manner of the page without disturbing the disposition of unturned statement forms with respect to said payroll summary sheet.

JOSEPH H. TATHWELL.

REFERENCES CITED

The following references are of record in the file of this patent:

UNITED STATES PATENTS

| Number | Name | Date |
|---|---|---|
| 631,127 | Razall | Aug. 15, 1899 |
| 1,068,885 | French | July 29, 1913 |
| 1,223,566 | Darby | Apr. 24, 1917 |
| 2,173,332 | Hoffman | Sept. 19, 1939 |
| 2,338,553 | Strauss | Jan. 4, 1944 |
| 2,363,601 | Lewis | Nov. 28, 1944 |

FOREIGN PATENTS

| Number | Country | Date |
|---|---|---|
| 163,031 | Switzerland | Sept. 16, 1933 |